(12) United States Patent
Zhang et al.

(10) Patent No.: US 12,554,716 B2
(45) Date of Patent: Feb. 17, 2026

(54) TIME SERIES DATA QUERY METHOD AND APPARATUS, ELECTRONIC DEVICE, AND STORAGE MEDIUM

(71) Applicant: Beijing Volcano Engine Technology Co., Ltd., Beijing (CN)

(72) Inventors: Gejin Zhang, Beijing (CN); Xiao Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/790,361

(22) Filed: Jul. 31, 2024

(65) Prior Publication Data

US 2025/0077520 A1    Mar. 6, 2025

(30) Foreign Application Priority Data

Aug. 31, 2023   (CN) .......................... 202311121242.1

(51) Int. Cl.
    *G06F 16/245*    (2019.01)
    *G06F 16/2453*    (2019.01)
    *G06F 16/2458*    (2019.01)

(52) U.S. Cl.
    CPC .... *G06F 16/24545* (2019.01); *G06F 16/2477* (2019.01)

(58) Field of Classification Search
    CPC ............................................... G06F 16/24545
    USPC ....................................................... 707/720
    See application file for complete search history.

(56) References Cited

U.S. PATENT DOCUMENTS

| | | | |
|---|---|---|---|
| 11,461,347 B1 * | 10/2022 | Das | ..................... G06F 16/2433 |
| 11,941,014 B1 * | 3/2024 | Das | ..................... G06F 16/219 |
| 2008/0270346 A1 * | 10/2008 | Mehta | .............. G06F 16/24542 |
| 2011/0106843 A1 * | 5/2011 | Pan | ................... G06F 16/24539 |
| | | | 707/769 |
| 2017/0337279 A1 | 11/2017 | Babu et al. | |
| 2018/0300178 A1 * | 10/2018 | Sandstrom | ............ G06F 9/5027 |

(Continued)

FOREIGN PATENT DOCUMENTS

| | | |
|---|---|---|
| CN | 109597837 A | 4/2019 |
| CN | 110222072 A | 9/2019 |

(Continued)

OTHER PUBLICATIONS

Office action received from Chinese patent application No. 202311121242.1 mailed on Jun. 10, 2025, 13 pages (7 pages English Translation and 6 pages Original Copy).

(Continued)

*Primary Examiner* — Baoquoc N To

(57) ABSTRACT

Embodiments of the present disclosure provide a time series data query method and apparatus, an electronic device and a storage medium, generating, by a time series data engine in response to a query instruction, a query task, wherein the query task is used for querying time series data stored in a storage engine; obtaining a query level of the query task based on the query task, which corresponding to a computing resource consumed by executing the query task; and distributing the query task to a target thread pool corresponding to the time series data engine based on the query level and obtaining a corresponding query result with the target thread pool, wherein the target thread pool has an independent thread resource matching the query level.

20 Claims, 9 Drawing Sheets

(56) References Cited

U.S. PATENT DOCUMENTS

2023/0141570 A1* 5/2023 Colmenares Diaz ........................ G06F 16/953 707/718
2024/0221039 A1* 7/2024 Burger ............... G06Q 30/0629

FOREIGN PATENT DOCUMENTS

| CN | 113031870 A | 6/2021 |
| CN | 114995996 A | 9/2022 |

OTHER PUBLICATIONS

Xiaolu et al., "Research and implementation of time series data storage engine based on time scale hierarchical technology", Journal of Computer Applications, vol. 37, No. 1, 2017, pp. 246-249.
Notice of grant received from Chinese patent application No. 202311121242.1 mailed on Sep. 12, 2025, 8 pages (4 pages English Translation and 4 pages Original Copy).

* cited by examiner

Time Series Data Data_2

| Indicator: Temperature | | |
|---|---|---|
| Floor = 30; Room = 3001; Device ID=123456 | | |
| Timestamp | value_1 | value_2 |
| 145820 | 26 | 26.2 |
| 145830 | 27.2 | 27.5 |
| ...... | ...... | ...... |
| 146800 | ...... | ...... |

Rows 145820 through 146800 are grouped as M.

TIME SERIES DATA QUERY METHOD AND APPARATUS, ELECTRONIC DEVICE, AND STORAGE MEDIUM

CROSS-REFERENCE TO RELATED APPLICATION

This application claims the priority to and benefits of the Chinese Patent Application, No. 202311121242.1, which was filed on Aug. 31, 2023. The aforementioned patent applications are hereby incorporated by reference in its entirety.

TECHNICAL FIELD

The embodiment of the disclosure relates to the technical field of cloud computing, in particular to a time series data query method and apparatus, an electronic device and a storage medium.

BACKGROUND

Time Series Data (TSD) is data recorded according to a time series, which is usually generated by continuous collection and recording based on relatively stable sampling frequency, such as equipment operation data and business revenue data.

The storing and querying of the time series data is usually performed by a dedicated time series data engine. A querying function for the time series data will lead to a large amount of computing resource overhead of the time series data engine in a large-scale application scenario of the time series data. The prior art solutions for querying the data result in the problems of slow response and poor operation stability of the time series data engine.

SUMMARY

The embodiments of the present disclosure provide a time series data query method and apparatus, an electronic device and a storage medium, to overcome the problems of slow response speed and poor operation stability of the time series data engine.

In a first aspect, an embodiment of the present disclosure provides a time series data query method, including:
generating, by a time series data engine in response to a query instruction, a query task, wherein the query task is used for querying time series data stored in a storage engine; obtaining a query level of the query task based on the query task, which corresponding to a computing resource consumed by executing the query task; and distributing the query task to a target thread pool corresponding to the time series data engine based on the query level and obtaining a corresponding query result with the target thread pool, wherein the target thread pool has an independent thread resource matching the query level.

In a second aspect, an embodiment of the present disclosure provides a time series data query apparatus, including:
a generation module configured to generate, by a time series data engine in response to a query instruction, a query task, wherein the query task is used for querying time series data stored in a storage engine;
a processing module configured to obtain a query level of the query task based on the query task, which corresponding to a computing resource consumed by executing the query task; and a query module configured to distribute the query task to a target thread pool corresponding to the time series data engine based on the query level and obtain a corresponding query result with the target thread pool, wherein the target thread pool has an independent thread resource matching the query level.

In a third aspect, an embodiment of the present disclosure provides an electronic device, including: a processor and a memory;
the memory stores computer-executable instructions;
the processor executes the computer-executable instructions stored by the memory, causes the at least one processor to perform the time series data query method of the first aspect and the various possible designs of the first aspect.

In a fourth aspect, an embodiment of the present disclosure provides a computer-readable storage medium storing computer-executable instructions thereon, when executed by a processor, implement the time series data query method according to the first aspect and the various possible designs of the first aspect.

In a fifth aspect, an embodiment of the present disclosure provides a computer program product including a computer program which, when executed by a processor, implements the time series data query method according to the first aspect and the various possible designs of the first aspect.

The present embodiment provides a time series data query method and apparatus, an electronic device and a storage medium. By generating, by a time series data engine in response to a query instruction, a query task, wherein the query task is used for querying time series data stored in a storage engine; obtaining a query level of the query task based on the query task, which corresponding to a computing resource consumed by executing the query task; and distributing the query task to a target thread pool corresponding to the time series data engine based on the query level and obtaining a corresponding query result with the target thread pool, wherein the target thread pool has an independent thread resource matching the query level. By determining the corresponding query level according to the computing resources consumed by executing the query task, and distributing the query task to the target thread pool matching the query level for processing, the dynamic allocation of query tasks with different computing resource consumption can be realized, so as to avoid the problem that the overweight query task affects the stability of the time series data engine and improve the running stability and response speed of the time series data engine.

BRIEF DESCRIPTION OF DRAWINGS

To describe the technical solutions in the embodiments of the present disclosure or in the prior art more clearly, the accompanying drawings required in the description of the embodiments or the prior art will be described briefly below. Apparently, other accompanying drawings can also be derived from these drawings by those ordinarily skilled in the art without creative efforts.

DETAILED DESCRIPTION

In order to make the purpose, technical scheme and advantages of the embodiment of the disclosure clearer, the technical scheme in the embodiment of the disclosure will be described clearly and completely with the attached drawings. Obviously, the described embodiment is a part of the embodiment of the disclosure, but not the whole embodiment. Based on the embodiments in this disclosure, all other embodiments obtained by ordinary technicians in this field without creative work belong to the protection scope of this disclosure.

It should be noted that the user information (including but not limited to user equipment information, user personal information, etc.) and data (including but not limited to data for analysis, stored data, displayed data, etc.) involved in this disclosure are all information and data authorized by users or fully authorized by all parties, and the collection, use and processing of relevant data need to comply with relevant laws, regulations and standards of relevant countries and regions, and corresponding operation portals are provided for users to choose authorization or rejection.

An application scenario of an embodiment of the present disclosure is explained below.

Figure 1:
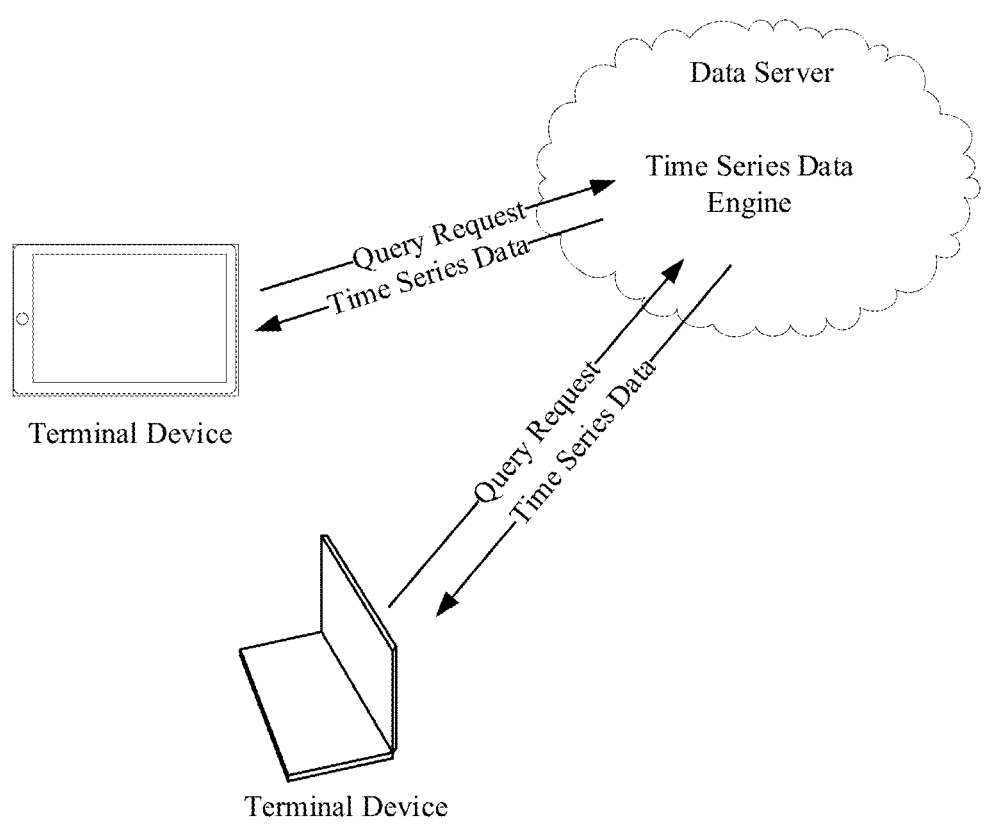
FIG. 1 is a diagram of an application scenario of a time series data query method provided by an embodiment of the present disclosure.

FIG. 1 is a diagram of an application scenario of a time series data query method provided by an embodiment of the present disclosure, which may be applied in application scenarios of cloud computing, cloud service, etc., and more specifically, may be applied in application scenarios of time series data query. The subject of execution of the present embodiment may be a data server running a time series data engine, or other electronic devices having similar functions, wherein the time series data engine is used for providing a time series data query service to the outside. Referring to FIG. 1, the data server is took for example, after receiving a data query request from an external terminal device, the data server invokes a time series data engine to perform a corresponding query task in response to the data query request, and after obtaining a corresponding query result, i.e., time series data, returns the time series data to the external terminal device, thereby implementing a one-time time series data query procedure.

In the related art, in a large-scale application scenario of time series data, the data of the time series data stored by the time series data engine is very large, the number of metrics in the time series data, and the time series under each of the metrics is very large, and in this case, the query request of the user may involve a large number of time series, and at the same time, the computing resource overhead of the time series data engine in the query process is further increased due to the complex filtering condition and the filtering dimension corresponding to the query request, so that the computing resource of the time series data engine is stressed or exhausted, thereby resulting in a decrease in the response speed of the time series data engine, affecting the running stability and performance of the time series data engine.

An embodiment of the present disclosure provides a time series data query method to solve the above problem.

Figure 2:
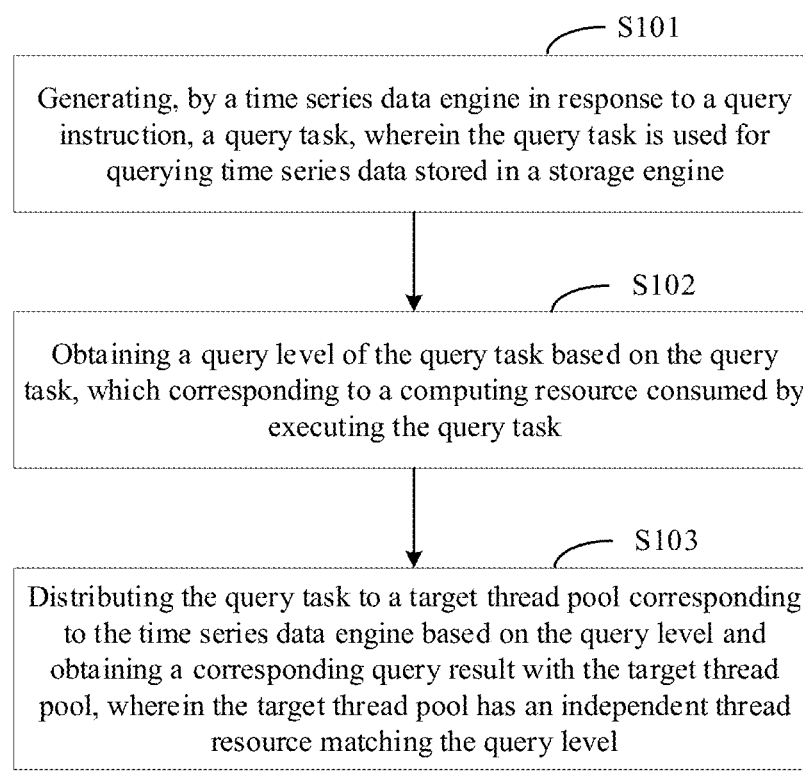
FIG. 2 is a flowchart diagram of a time series data query method according to an embodiment of the present disclosure.

Referring to FIG. 2, FIG. 2 is a flowchart diagram of a time series data query method according to an embodiment of the present disclosure. The method of the present embodiment may be applied in a server or an electronic device serving a similar function, the time series data query method includes:

S101, generating, by a time series data engine in response to a query instruction, a query task, wherein the query task is used for querying time series data stored in a storage engine.

Exemplarily, referring to the application scenario schematic diagram shown in FIG. 1, after receiving the query instruction sent by the external terminal device, the data server responds thereto, generates a corresponding query task, and pushes the query task into a preset task queue for queuing processing. The query task is a task for execution by the time series data engine to obtain the results of the time series data query requested by the query instruction. Further, the query task generated based on the query instruction stores the query condition information corresponding to the query instruction, specifically, for example, the filtering condition corresponding to the query instruction, and more specifically, for example, the query task includes the index of the time series data, the label, the time period, and the like for data positioning. Then, the time series data engine executes the query task to obtain the target time series data meeting the filtering condition, thereby completing the data query.

S102, obtaining a query level of the query task based on the query task, which corresponding to a computing resource consumed by executing the query task.

Exemplarily, after the query task is generated, a query level corresponding to the query task is determined based on information contained in the query task, wherein the query level corresponds to the computing resource consumed by executing the query task, i.e., it is used to characterize the computing resources consumed by executing the query task, e.g., the query level includes Level I, Level II, Level III. Exemplarily, Level I corresponds to a high computing resource overhead, i.e., completing the query task of Level I once, requires the time series data engine to consume more computing resource, i.e., an overweight query. Accordingly, Levels II and III correspond to medium and low computing resource overhead, i.e., heavy query and light query, respectively. Completing a Level II query task requires moderate computing resource by the time series data engine, while completing a Level III query task requires less computing resource by the time series data engine. In this embodiment, the computing resource may be one or more of CPU resource, thread resource, memory resource, etc. of the time series data engine, and may be set according to specific needs. The amount of the computing resource consumed in this embodiment may be expressed as a proportion of the total computing resource of the time series data engine. For example, a resource overhead of more than 1% of the total computing resource of the time series data engine is defined as a high computing resource overhead, and a resource overhead of less than one ten thousandth of the total computing resource of the time series data engine is defined as a low computing resource overhead. Further, the above-described division of the query levels is exemplary only, and the query levels may be further divided into more or less levels, as desired, and will not be repeated here by way of example.

In one possible implementation, the query level is determined based on data characteristic of the target time series data corresponding to the query task. The data characteristic include, for example, the data amount of the target time series data, the filtering complexity, etc. Specifically, for example, when the higher the data amount of the target time series data corresponding to the query task, such as the longer the filtered data period, the larger the resource consumption required by the time series data engine to process the query task and obtain the corresponding query result. Again, for example, when the more complex the filtering rule corresponding to the query task, such as the more tags are filtered, the more times the time series data engine needs to traverse the entire time series data, the larger the corresponding required resource consumption. On the contrary, the smaller the resource consumption of the time series data engine. Therefore, the corresponding query level can be obtained according to the data characteristics based on the target time series data corresponding to the query task.

More specifically, in one possible implementation, a mapping table of the data characteristic and query level is configured in the time series data engine. After obtaining a query task, the query task is parsed to obtain data characteristics of the target time series data queried by its corresponding query instruction. The data characteristic may be characteristic of one dimension of the target time series data or may be a collection of characteristics of multiple dimensions of the target time series data. Then, the corresponding query level is derived based on this data characteristic and the mapping table described above.

S103, distributing the query task to a target thread pool corresponding to the time series data engine based on the query level and obtaining a corresponding query result with the target thread pool, wherein the target thread pool has an independent thread resource matching the query level.

Illustratively, a thread pool may be a computing unit set within the time series data engine for task processing. The thread pool consists of a plurality of processor threads. Processor threads are provisioned by the thread pool to enable multi-thread processing in a computing process. In the time series data engine, at least two of the above-described thread pools are set, with independent thread resources in each thread pool. That is, each thread pool works independently, i.e., even when one of the thread pools is in a highly loaded, thread resource depleted state, the other thread pool(s) is(are) not affected and are able to process tasks normally.

Further, exemplarily, after the query level is obtained, the target thread pool matched thereto is determined further according to the consumption amount of the computing resource represented by the query level. Then, the query task corresponding to the query level is processed based on the independent thread resource of the target thread pool, and a query result is obtained. On the one hand, since the target thread pool has the thread resource (computing resource) matched with the query task at the query level, it is possible to realize that more computing resources are allocated for a heavy query task, thereby increasing the execution speed of the query task. On the other hand, it is possible to guarantee that query tasks at different query levels do not interact with each other by setting thread resources independent from each other for a plurality of thread pools, thereby avoiding the problem that overweight query tasks occupy excessive computing resource, which leads to resource exhaustion of the time series data engine.

Figure 3:
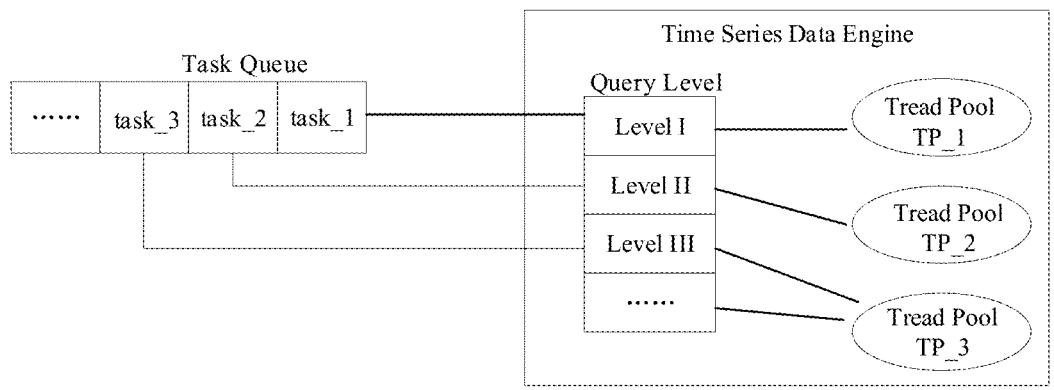
FIG. 3 illustrates a process of distributing a query task according to an embodiment of the present disclosure.

FIG. 3 is a diagram illustrating a process of distributing a query task according to an embodiment of the present disclosure. As shown in FIG. 3, the time series data engine determines a query level of the query task after obtaining the query task from the task queue. Exemplarily, when the query level of the query task task_1 (shown as task_1) in the task queue is Level I, Level I identifies the query task as an overweight query, i.e., a query task that needs to consume a lot of computing resources. In this case, the time series data engine sends the query task task_1 to a thread pool TP_1 with two processing threads for processing. When the query level of query task task_2 (shown as task_2) is Level II, Level II identifies the query task as a heavy query, i.e., a query task that needs to consume moderate computing resource, in which case the time series data engine sends the query task task_2 to a thread pool TP_1 with six processing threads for processing. When the query level of query task task_3 (shown as task_3) is level III (and higher query levels), level III identifies that the query task is a light query, i.e., a query task that needs to consume less computing resource, in which case the time series data engine sends the query task task_3 to a thread pool TP_3 with two processing threads for processing.

Referring to the description of the embodiment of FIG. 3, the mapping relationship between the query level and the target thread pool is not mapped in a positively correlated manner based on the computing resource consumed by the query task and the thread resources that the thread pool has, but the query level and the target thread pool are mapped from the perspective of the overall operational stability of the time series data engine. That is, in one possible implementation, the method further includes setting the amount of thread resources for each thread pool based on target logic, wherein the target logic includes maximizing the number of times that the time series data engine executes the query task within the first unit time.

Figure 4:
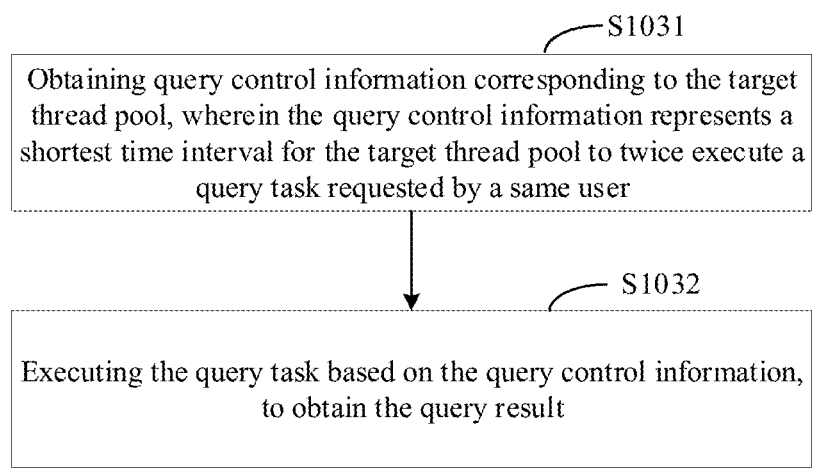
FIG. 4 is a flowchart of a specific implementation of step S103 in the embodiment shown in FIG. 2.

Further, in one possible implementation, as shown in FIG. 4, a specific implementation of step S103 includes:

S1031, obtaining query control information corresponding to the target thread pool, wherein the query control information represents a shortest time interval for the target thread pool to twice execute a query task requested by a same user.

S1032, executing the query task based on the query control information, to obtain the query result.

Exemplarily, the query control information is control information for the response frequency of the thread pool to the query task requested by the same user, the query control information for example including a frequency value f representing the maximum number of responses per minute (e.g. f=2), or the minimum interval duration t (e.g. t=2 seconds). When the time series data engine receives a query task that needs to be processed by the target thread pool sent by the same user, that is, a target query task having a target query level corresponding to the target thread pool, the time series data engine determines whether to respond to the query task based on the query control information of the target thread pool, and immediately responds to the query task if the currently received query task meets the control condition of the query control information. If the currently received query task does not meet the control conditions for querying the control information, the query task may be delayed from responding to the query task until the query task meets the control conditions for querying the control information, and then executes the query task, thereby proper allocation of thread pool resources is ensured, overweight query tasks requested by the same user exhausts resource of the target thread pool is avoid, so that the data engine can not respond to requests sent by other users.

Figure 5:
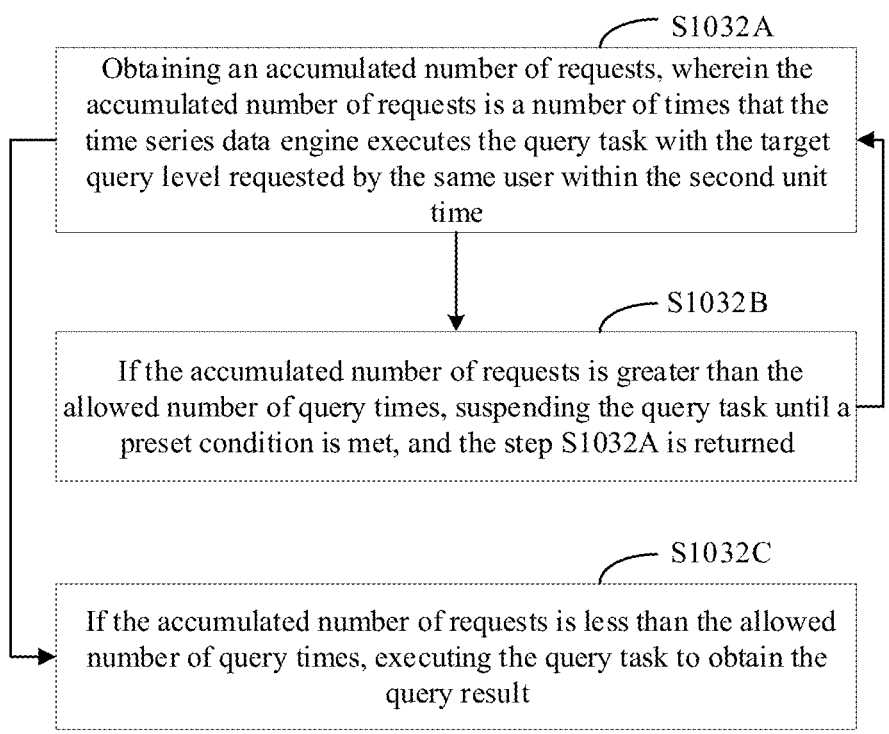
FIG. 5 is a flowchart of a specific implementation of step S1032 in the embodiment shown in FIG. 4.

In one possible implementation, the query control information includes the number of allowable queries within the second unit time, as shown in FIG. 5, a specific implementation of the step S1032 includes:

S1032A, obtaining an accumulated number of requests, wherein the accumulated number of requests is a number of times that the time series data engine executes the query task with the target query level requested by the same user within the second unit time.

S1032B, if the accumulated number of requests is greater than the allowed number of query times, suspending the query task until a preset condition is met, and the step S1032A is returned.

S1032C, if the accumulated number of requests is less than the allowed number of query times, executing the query task to obtain the query result.

Illustratively, the time series data engine, after receiving a query instruction sent by a user, records the user identification of the user and counts the number of query tasks sent by the user at different query levels accumulated in the second unit of time, i.e., the accumulated number of requests. For example, the user User_1 corresponds to an accumulated number of requests count_1=3, which means that the accumulated number of requests of Level I query task requested by the user User_1 in 1 minute (second unit time) is 3. The user User_1 corresponds to an accumulated number of requests count_2=2, which means that the accumulated number of requests of the Level II query task requested by the user User_1 within 1 minute (second unit time) is 2. The user User_1 corresponds to an accumulated number of requests count_3=5, which means that the accumulated number of requests of the level III query task requested by the user User_1 within 1 minute (second unit time) is 5.

Accordingly, since the query control information corresponds to the target thread pools (query levels), each target thread pool (query level) corresponds to an allowed number of queries, for example, the thread pool TP1 processing Level 1 query task corresponds to 3 (times/minute), the thread pool TP2 processing Level II query task corresponds to 8 (times/minute), and the thread pool TP3 processing Level III query task corresponds to 2 (times/minute). Then, the accumulated number of requests is compared with the allowed number of queries corresponding to the query control information. If the accumulated number of requests is greater than or equal to the allowed number of queries corresponding to the query control information, it means that the query task for the target thread pool is "excessive" at this time, the query task is suspended, i.e., it is not temporarily processed, returns to step S1032A, and the accumulated number of requests continues to be counted. Since the current query task is not executed, the accumulated number of requests decreases as time progresses until the accumulated number of requests is less than the allowed number of queries corresponding to the query control information, the query task is executed, and a query result is obtained. (Step S1032C). The specific implementation of the process in which the thread pool performs the query task has been described in the previous section and will not be repeated here.

In step of the present embodiment, limiting the current running load of the thread pool is achieved by allowing the number of queries, thereby achieving a balanced allocation of thread resources within the thread pool, avoiding that all thread resources are occupied by query tasks requested by the same user, and enabling the thread pool to perform more query tasks of multiple users. In the meantime, the number of times of running queries corresponds to the query level, so that thread pools which process different query levels correspond to different permitted query times, thereby further improving the resource utilization of each thread pool, and improving the stability and query performance of the time series data engine.

In this embodiment, a query task is generated by the time series data engine in response to a query instruction, the query task being for querying time series data stored in the storage engine; Obtaining, from the query task, a query level for the query task, the query level corresponding to computing resources consumed to execute the query task; Distributing the query task to a corresponding target thread pool of the time series data engine according to the query level and obtaining a corresponding query result through the target thread pool, wherein the target thread pool has an independent thread resource matching the query level. By determining a corresponding query level according to a computing resource consumed by executing the query task, and by distributing the query task to a target thread pool matching the query level for processing, dynamic allocation of query tasks to different amounts of consumption of computing resources is achieved, thereby avoiding the problem that excessive query tasks affect the stability of the time series data engine, and improving the running stability and response speed of the time series data engine.

Figure 6:
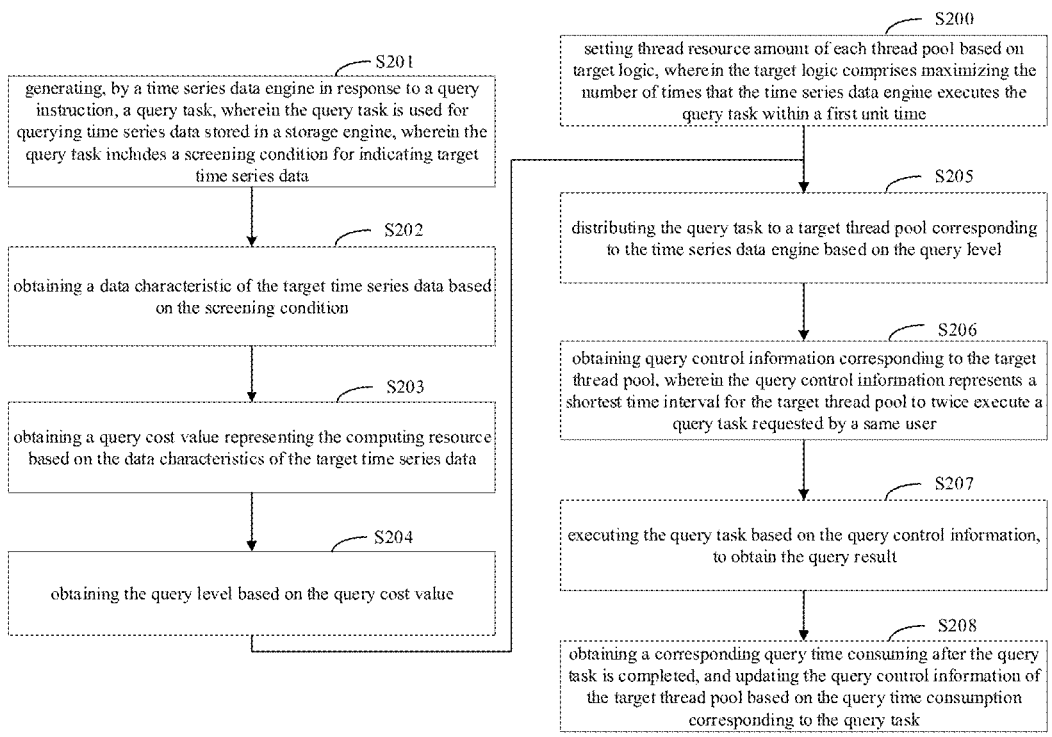
FIG. 6 is a flowchart diagram illustrating a time series data query method according to an embodiment of the present disclosure.

Referring to FIG. 6, FIG. 6 is a flowchart diagram illustrating a time series data query method according to an embodiment of the present disclosure. The present embodiment further refines the step S102 on the basis of the embodiment shown in FIG. 2, and the time series data query method includes:

S201, generating, by a time series data engine in response to a query instruction, a query task, wherein the query task is used for querying time series data stored in a storage engine, wherein the query task includes a filtering condition for indicating target time series data.

S202, obtaining a data characteristic of the target time series data based on the filtering condition.

S203, obtaining a query cost value representing the computing resource based on the data characteristics of the target time series data.

Illustratively, the query task generated by the time series data engine in response to the query instruction includes filtering criteria indicative of the goal achievement data, metrics, labels, time segments, and the like indicative of the time series data. The time series data engine then generates corresponding data characteristic based on the filtering condition. In one possible implementation, the filtering condition characterizes the manner in which the time series data is queried, and the data characteristics characterize the target time series data corresponding to the filtering condition on the data structure and the manner in which the query is queried for the target time series data. The above characteristics (data characteristics and query mode characteristics) affect the computation of the time series data engine when executing the query task, and therefore, based on the preset mapping relationship, the query cost value representing the computing resource, i.e., the computing resource consumed for executing the query task, can be obtained based on the data characteristics of the target time series data.

Illustratively, the data characteristics of the target time series data are target data characteristics, the query cost value includes a first cost value and/or a second cost value. The first cost value characterizes computing resource (affected by the query-wise characteristics and the data characteristics) consumed by filtering time series data having the target data characteristic. The second cost value characterizes the computing resource (affected by the data characteristics) consumed by transmitting time series data with the target data characteristic.

Figures 7, 8:
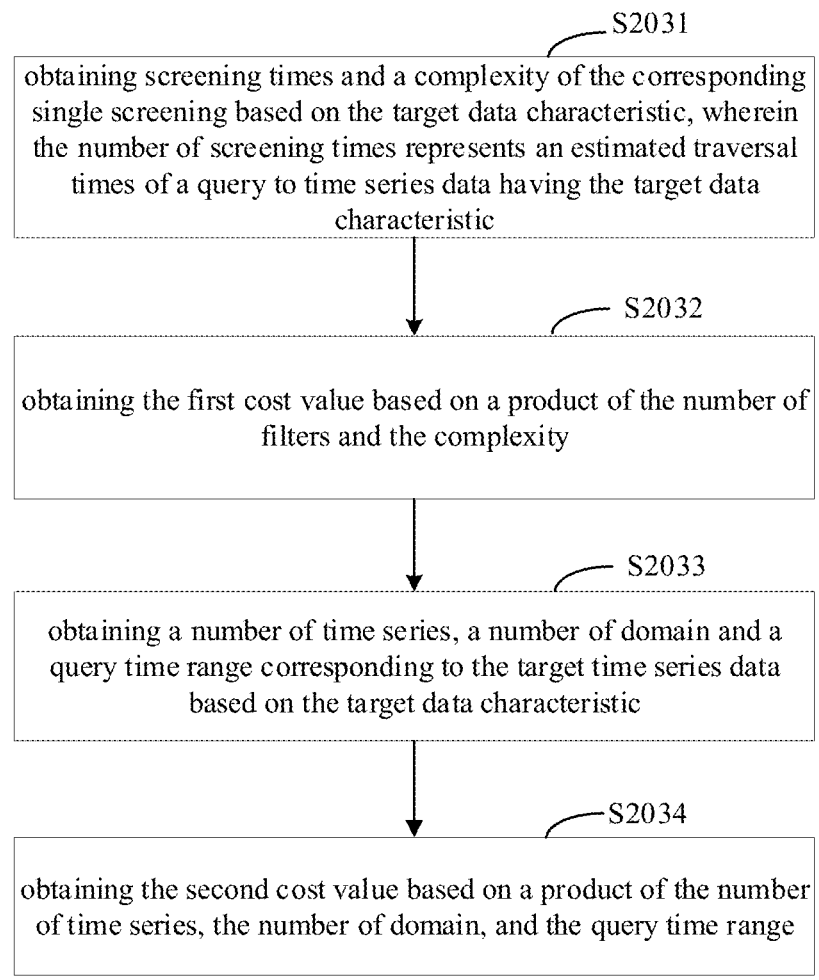
FIG. 7 is a flowchart of a specific implementation of step S203 in the embodiment shown in FIG. 6.
FIG. 8 is a schematic structural diagram illustrating target time series data according to an embodiment of the present disclosure.

In one possible implementation form, as shown in FIG. 7, a specific implementation form of step S203 includes:

S2031, obtaining filtering times and a complexity of the corresponding single filtering based on the target data characteristic, wherein the number of filtering times represents an estimated traversal times of a query to time series data having the target data characteristic.

Exemplarily, the number of filtering times is data representing the number of times that the query needs to traverse to the time series data having the target data characteristic, and the number of filtering times is a preset value corresponding to the target data characteristic. For example, when the target data characteristic is A, the corresponding number of filtering times is N1. When the target data characteristic is B, the corresponding number of filtering times is N2. The number of filtering times is determined based on the data structure (number of time series, number of tags, etc.) of the time series data stored in the time series data engine.

In one possible implementation form, exemplarily, the step of obtaining the number of filtering times according to the target data characteristic includes obtaining a number of tags and a number of time series corresponding to the target time series data according to the target data characteristic, and obtaining the number of filtering times according to the number of tags and the number of time series.

In one possible implementation, the time series data is composed of several dimensions of Metrics, Tags, and Time Series, wherein The Metrics are used to characterize the data content of the time series data, the Tags are used to characterize the data category under the data content, and the Time Series(TimeSeries) are composed of keys and corresponding values, respectively representing Timestamps and corresponding data values(Value). As shown in FIG. 8, the target time series data Data_1 has an index of temperature (shown as index: temperature), and the contents of the set of time series data Data_1 are temperature data. Further, the time series data Data_1 also has 3 tags (Tag Group A), Tag 1: Floor=30, Tag 2: Room=3001, Tag 3: Device ID=123456, respectively. The data category under the data content (temperature) is limited by the above three tags. Further, the time series data Data_1 includes a time series, i.e. N data points (i.e. the number of time series is N), each data point includes a time stamp and a corresponding data value. For example, in the figure, a time stamp of 145820 corresponds to a data value of 26 means that at the time of "145820" the temperature is 26 degrees Celsius. Accordingly, a timestamp of 145830 corresponds to a data value of 27 means that the temperature is 27 degrees Celsius at the time of "145830," and a timestamp of 145840 corresponds to a data value of 28 means that the temperature is 28 degrees Celsius at the time of "145840." Further, the time series data may also include a plurality of tag groups, such as tag group B, tag group C, etc., to enable filtering of a plurality of types of data, which will not be described in detail herein by way of example.

Referring to the structural diagram of the target time series data shown in FIG. 8, the index and the label in the target time series data are target data characteristics of the target time ordinal, which are determined by the filtering condition in the query task, and therefore, the corresponding target data characteristic can be determined based on the filtering condition, thereby obtaining the corresponding number of labels and the number of time series. Thereafter, the number of filtering times is approximately estimated based on the number of labels and the number of time series corresponding to each label, wherein the larger the number of labels and the larger the number of time series, the larger the corresponding number of filtering times. In one possible implementation, the product of the number of labels and the number of time series may be approximated as the number of filtering times.

Further, according to the target data characteristics, the specific implementation step of obtaining the complexity of the single filtering includes:

Obtaining filtering information based on the target data characteristic, the filtering information representing a filtering type used to query time series data with the target data characteristic, and obtaining the complexity of the single filtering based on the filtering information.

The filter type characterized by the filtering information may be a filtering type function used to filter all of the time series data in the time series data engine, including, for example, a target filter function literal (para_1), wherein para_1 is an input parameter that characterizes a filtering condition, and the target filter function may be configured to target para_1 to filter out the time series data that meets the input parameter para_1; For another example, a non-target filter function not_literal (para_1), the non-target filter function may be used to target para_1 and filter out time series data that do not meet the input parameter para_1; For another example, the regular expression function regexp( ) filters the corresponding time series data with a regular expression. The filter type includes at least two types, such as a simple filter type and a complex filter type, wherein, for example, the target filter function and the non-target filter function in the above example, are the simple filter type; And regular expression functions are complex filter types. On this basis, it is possible to further refine the filter type into more filter type, such as a first filter type, a second filter type, a third filter type, etc., and different filter types correspond to different complexities, which will not be described in detail here. Further, the complexity may be expressed in a specific numerical value, for example, a simple filter type corresponds to a complexity of 1 and a complex filter type corresponds to a complexity of 2, and the above mapping relationship may be preset and is not specifically limited here.

S2032, obtaining the first cost value based on a product of the number of filtering times and the complexity.

Exemplarily, then, a value representing the computing resource consumed for filtering the time series data having the characteristics of the target data, i.e., the first cost value, may be obtained based on the product of the number of filtering times obtained in the above steps and the complexity corresponding to the filtering conditions.

Further, the step S203 may further include:

S2033, obtaining a number of time series, a number of domain and a query time range corresponding to the target time series data based on the target data characteristic.

S2034, obtaining the second cost value based on a product of the number of time series, the number of domain, and the query time range.

Figures 9, 10:
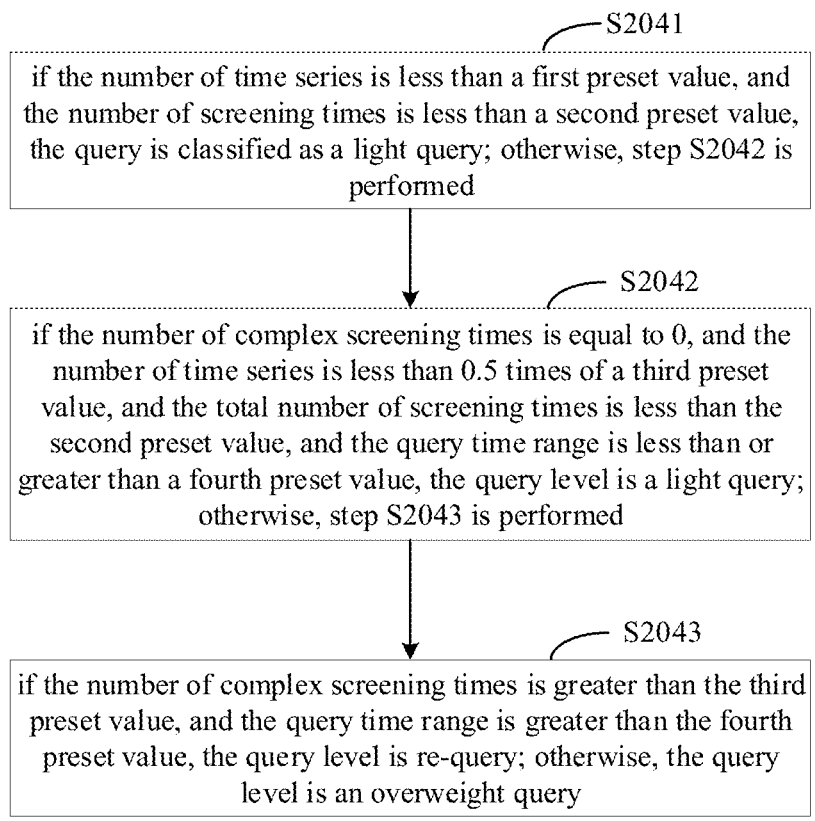
FIG. 9 is a schematic diagram illustrating another target time series data according to an embodiment of the present disclosure.
FIG. 10 is a flowchart of a specific implementation of step S204 according to an embodiment of the present disclosure.

Illustratively, on the basis of calculating the first cost value, a second cost value representing the computing resources consumed to transmit the time series data having the target data characteristics may be further calculated, and the query level may be determined based on the second cost value alone, or based on the first cost value and the second cost value together. Therein, in particular, the number of fields refers to the number of data values corresponding to the time series in the time series data, that is, the number of data files. FIG. 9 is a schematic diagram illustrating another target time series data according to an embodiment of the present disclosure, wherein the target time series data Data2 has an index of temperature (shown as index: temperature), the content of the set of time series data Data_2 is temperature data, and the time series data Data_1 further has 3 tags, respectively: Tag 1: Floor=30, Tag 2: Room=3001, Tag 3: Device ID=123456. The data category under the data content (temperature) is limited by the above three tags. Further, the time series data Data_2 includes M time series corresponding to the query time range (145820-146800), i.e., M data points, each data point including a timestamp and corresponding data values Value_1 (shown as Value_1) and Value_2 (shown as Value_2), i.e., the number of domains is 2. Wherein the data value Value_1 represents a lower temperature limit value, the data value Value_2 represents an upper temperature limit value, and through the data value Value_1 and the data value Value_2, temperature fluctuations within the time period corresponding to the time stamp can be represented. For example, the time stamp 145820 corresponds to a data value value_1 of 26 and a data value value_2 of 26.2, indicating that the temperature fluctuates between 26-26.2 degrees Celsius during the time period corresponding to time "145820" (e.g., time 145820 to time 145810); Accordingly, a time stamp of 145830 corresponds to a data value value_1 of 27.2 and a data value value_2 of 27.5, indicating that the temperature fluctuates between 27.2 and 27.5 degrees Celsius during the time period corresponding to time "145830" (e.g., time 145830 to time 145820).

The number of time series, the number of domains, and the query time range may be obtained based on the corresponding target data characteristics of the target time series data shown in FIG. 9, and then a second cost value of the computing resource consumed by the time series data for representing the target data characteristics may be obtained based on the number of time series, the number of domains, and the query time range, and specifically, the second cost value may be obtained by mapping the number of time series, the number of domains, and the query time range into a normalized first time-consuming coefficient, a second time-consuming coefficient, and a third time-consuming coefficient, respectively, and then based on a weighted sum of the three time-consuming coefficients. Alternatively, the product of the number of time series, the number of domains, and the query time range is computed, resulting in a second cost value. The specific implementation of the second cost value is defined here and can be configured as desired.

S204, obtaining the query level based on the query cost value.

Illustratively, after obtaining the first cost value and/or the second cost value described above, the first cost value alone as the query cost value, the second cost value alone as the query cost value, or the first cost value and the second cost value as the query cost values may be mapped to the corresponding query level, as desired. Wherein the order in which the first cost value and the second cost value are calculated may be set as desired, and the specific mapping between the query cost value and the query level may be determined based on the specific amount of resources of the time series data engine.

Illustratively, where the query level corresponds to a target cost value interval, the target cost value interval is the cost interval in which the query cost value is located. The query level corresponding to the query cost value is obtained by mapping the query cost value to the corresponding cost interval based on the mapping of the cost interval to the query level.

In one possible implementation form, the query cost value includes at least two cost elements, the cost elements representing a cost dimension of the query cost value; A specific implementation manner of the step S204 includes:

S204A, obtaining cost thresholds respectively corresponding to the at least two cost elements.

S204B, obtaining a corresponding Boolean value of the cost element based on a result of comparing the numerical value of the cost element with a corresponding cost threshold.

S204C, obtaining the query level based on a result of a logical operation of Boolean values corresponding to the at least two cost elements.

Illustratively, the query cost value characterizes the computing resources consumed by executing the query task, while the cost element is a cost dimension of the query cost value, i.e., an influencing factor that influences the computing resources consumed by executing the query task, more specifically, the cost element is, for example, the number of time series of time series data, the query time range, and the like. Wherein each cost element corresponds to a cost threshold, e.g. cost element A corresponds to a cost threshold, threshold 1=10; the cost element B corresponds to a cost threshold threshold_2=120. By comparing the cost element with the corresponding cost threshold, according to the result (size relationship) of the comparison between the two, the corresponding Boolean value of the cost element is obtained, which Boolean value is indicative of the cost element being larger than the cost threshold or smaller than the cost threshold; Then, according to the logical operation (OR operation, sum operation, exclusive OR operation) between the Boolean values corresponding to the plurality of cost elements, the query level is obtained, and through the above steps in the present embodiment, more accurate evaluation of the query level can be achieved.

In one possible implementation, the query cost value includes the number of time series, the total filtering times, the complex filtering times, and the query time range, where the complex filtering times refers to the number of filter processes having a filter complexity greater than a threshold. The number of time series, the total number of filtering times, the complex number of filtering times, and the query time range can be determined by the data characteristics of the time series data, and the specific determination method will not be described in detail herein. Exemplarily, as shown in FIG. 10, the specific implementation flow of step S204 includes:

S2041, if the number of time series is less than a first preset value, and the number of filtering times is less than a second preset value, the query is classified as a light query; otherwise, step S2042 is performed.

S2042, if the number of complex filtering times is equal to 0, and the number of time series is less than 0.5 times of a third preset value, and the total number of filtering times is less than the second preset value, and the query time range is less than or greater than a fourth preset value, the query level is a light query; otherwise, step S2043 is performed.

S2043, if the number of complex filtering times is greater than the third preset value, and the query time range is greater than the fourth preset value, the query level is heavy query; otherwise, the query level is an overweight query.

Referring to FIG. 10, the data sequences are first compared with a first preset value, the number of times of filtering and a second preset value by comparing, and if the number of time series is less than the first preset value and the number of times of filtering is less than the second preset value, it is determined that the query task consumes less computing resources, and thus the level of the query corresponding thereto is a light query. Wherein, exemplarily, the first preset value is, for example, 12000; the first preset value is for example 6; after that, if the above condition is not satisfied, the complex number of filtering times, the time series number, the total number of filtering times, and the query time range continue to be compared, and if the above cost value satisfies the condition in step S2042, i.e., the complex number of filtering times is equal to 0, and the time series number is less than 0.5 times of a third preset value, and the total number of filtering times is less than the second preset value, and the query time range is less than or greater than a fourth preset value, which is illustratively 100000, the level of the query corresponding thereto is still a light query. Further, if the above condition is not satisfied, the complex filtering times and the query time range continue to be compared, and if the above cost value satisfies the condition in step S2043, i.e., the complex filtering times is greater than the third preset value, and the query time range is greater than the fourth preset value, it is judged that the computing resource consumed by the query task is large, and thus the level of the corresponding query is heavy query; finally, if the above condition is still not satisfied, it is judged that the computing resources consumed by the query task are huge, and the level of the corresponding query is an overweight query.

In the step of the present embodiment, the accuracy of evaluation of the query level is further improved by a specific method for calculating the query level by the query cost value, so that the target thread pool is more matched with the query level of the query task when the target thread pool is determined by allocating computing resources for the query task based on the query level later, and the performance and running stability of the time series data engine are improved.

Before the step S205, further including:

S200, setting thread resource amount of each thread pool based on target logic, wherein the target logic includes maximizing the number of times that the time series data engine executes the query task within a first unit time.

Figure 11:
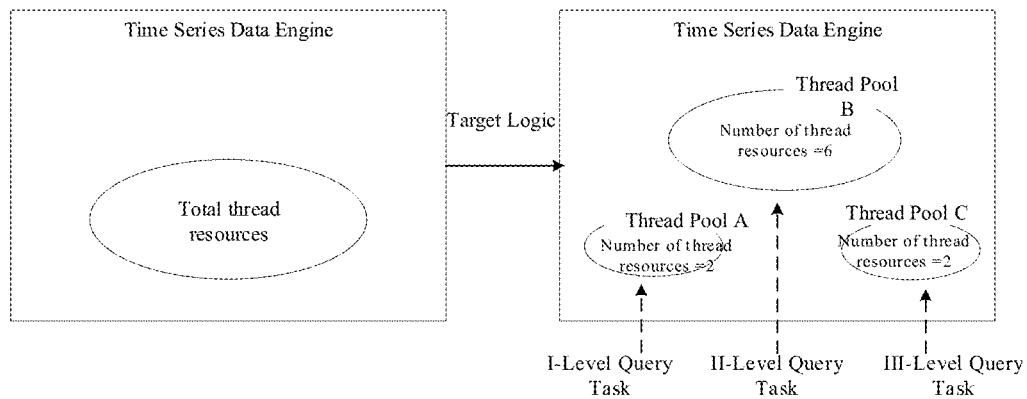
FIG. 11 shows a schematic diagram illustrating an amount of thread resources allocated to a thread pool according to an embodiment of the present disclosure.

Illustratively, the thread resources of each thread pool of the time series data engine for processing the query task are configured based on the target logic before the query task is sent to the corresponding target thread pool for processing, so as to maximize the number of times the time series data engine executes the query task within the first unit of time, i.e., maximize the execution efficiency of the time series data engine. FIG. 11 is a schematic diagram illustrating the amount of thread resources allocated to thread pools according to an embodiment of the present disclosure, wherein thread pool A, thread pool B, and thread pool C are set in a time series data engine, wherein the number of thread resources included in thread pool A=2, the number of thread resources included in thread pool B=6, and the number of thread resources included in thread pool C=2. Here, the number of thread resources may refer to a CPU specific number of threads or may refer to a percentage of CPU thread resources. Further, thread pool A is used to handle level I query tasks, i.e., overweight query tasks; thread pool B is used to process Level II query tasks, i.e., heavy query tasks; thread pool C is used to process level III query tasks, i.e., light query tasks. As shown in FIG. 11, the above-described target logic for allocating the amount of thread resources, rather than allocating the corresponding amount of thread resources in proportion to the computing resource overhead characterized by the query level corresponding to the thread pool, targets maximizing the execution efficiency of the time series data engine, i.e., the heavy query task allocates a larger amount of thread resources and the overweight query and light query tasks allocate a smaller amount of thread resources. When configured based on the target logic, the time series data engine can act as a current-limiting function to avoid over-occupying the total thread resources for the overweight query task, and for the heavy query task and the light query task, the time series engine may function as an optimized allocation of resources, thereby improving the efficiency of execution of the heavy query task and improving resource utilization.

S205, distributing the query task to a target thread pool corresponding to the time series data engine based on the query level.

S206, obtaining query control information corresponding to the target thread pool, wherein the query control information represents a shortest time interval for the target thread pool to twice execute a query task requested by a same user.

S207, executing the query task based on the query control information, to obtain the query result.

Optionally, after the step S207, further including:

S208, obtaining a corresponding query time consuming after the query task is completed, and updating the query control information of the target thread pool based on the query time consumption corresponding to the query task.

Exemplarily, each time the query task is executed and the corresponding query result is obtained, the query time consumption corresponding to the query task may be further obtained. Since the query level corresponding to the query task has been obtained by the time series data engine before the query task is executed and sent to the target thread pool corresponding to the query level and the thread resources of each thread pool are different, the problem that the query time consumption is too long when the query task and the query control information are not suitable, e.g., the query time consumption is more than 200 milliseconds based on the query control information of the current target thread pool after distributing the query task of level II representing the heavy query to the corresponding target thread pool, then, it is judged that the current query control information is not reasonable, and at this time, the query control information of the target thread pool is updated, specifically, for example, the minimum time interval for the target thread pool to perform the query task requested by the same user twice is increased, thereby reducing the frequency of the target thread pool responding to the heavy query task of the same user, thereby reducing the query time consumption and improving the system stability.

In the present embodiment, the implementation of steps S205 to S207 has been introduced at the corresponding location in the embodiment shown in FIG. 2 of the present disclosure, and will not be described in detail here.

Figure 12:
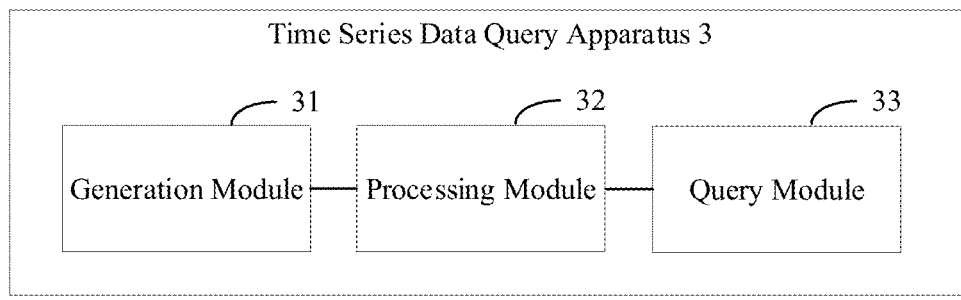
FIG. 12 is a structural block diagram of a time series data query apparatus according to an embodiment of the present disclosure.

FIG. 12 is a structural block diagram of a time series data query apparatus according to an embodiment of the present disclosure, corresponding to the time series data query method of the above embodiment. For convenience of explanation, only parts related to the embodiments of the present disclosure are shown. Referring to FIG. 12, the time series data query apparatus 3 includes:

a generation module 31 configured to generate, by a time series data engine in response to a query instruction, a query task, wherein the query task is used for querying time series data stored in a storage engine;

a processing module 32 configured to obtain a query level of the query task based on the query task, which corresponding to a computing resource consumed by executing the query task; and a query module 33, configured to distribute the query task to a target thread pool corresponding to the time series data engine based on the query level and obtain a corresponding query result with the target thread pool, wherein the target thread pool has an independent thread resource matching the query level.

In one embodiment of the present disclosure, a filtering condition for indicating the target time series data is included in the query task, the processing module 32 is specifically configured to: obtain the data characteristic of the target time series data according to the filtering condition; obtaining a query cost value representing the computing resource based on data characteristics of the target time series data; based on the query cost value, a query level is obtained.

In one embodiment of the present disclosure, the data characteristics of the target time series data are target data characteristics, the query cost value includes a first cost value and/or a second cost value; wherein the first cost value characterizes computing resources consumed by filtering time series data having the target data characteristic; the second cost value characterizes computing resources consumed to transmit time series data having characteristics of the target data.

In one embodiment of the present disclosure, the processing module 32, when obtaining the query cost value representing the computing resource according to the data characteristics of the target time series data, is specifically configured to: derive a number of filtering times and a corresponding complexity of single filtering according to the target data characteristics, wherein the number of filtering times characterizes an estimated number of traverses of the query to the time series data having the target data characteristics; from the product of the number of filtering times and the complexity, a first cost value is obtained.

In an embodiment of the present disclosure, the processing module 32, when obtaining the number of filtering times and the complexity of the corresponding single filtering according to the target data characteristic, includes at least one of: obtaining the number of labels and the number of time series corresponding to the target time series data according to the target data characteristic, and obtaining the number of filtering times according to the number of labels and the number of time series; Based on the target data characteristic, filtering information is obtained, the filtering information characterizes a filtering type used to query the time series data having the target data characteristic, and a complexity of a single filter is obtained based on the filtering information.

In one embodiment of the present disclosure, the processing module 32, when obtaining the query cost value representing the computing resource according to the data characteristics of the target time series data, is specifically configured to: obtain the number of time series, the number of domains and the query time range corresponding to the target time series data according to the target data characteristics; from the product of the number of time series, the number of domains, and the query time range, a second cost value is obtained.

In one embodiment of the present disclosure, the querying module 33 is further configured to: set the amount of thread resources of each thread pool based on the target logic; wherein the targeting logic includes maximizing the number of times the time series data engine executes the query task within the first unit of time.

In one embodiment of the present disclosure, the query module 33, when getting the corresponding query result by the target thread pool, is specifically configured to: acquire query control information corresponding to the target thread pool, the query control information being used to characterize a shortest time interval for the target thread pool to twice execute the query task requested by the same user; based on the query control information, a query task is executed, resulting in a query result.

In one embodiment of the present disclosure, the query control information includes the number of permissible inquiries within the second unit time; the query module 33, when performing the query task according to the query control information to obtain the query result, is specifically configured to: acquire an accumulated number of requests, the accumulated number of requests being the number of times the time series data engine performs the query task with the target query level requested by the same user in the second unit time; if the accumulated number of requests is greater than the allowed number of queries, the query task is suspended until a preset condition is met.

In one embodiment of the present disclosure, the query module 33 is further configured to: after the query task is finished executing, it is time consuming to acquire the corresponding query; the query control information of the target thread pool is updated according to the query time consumption corresponding to the query task.

The generating module 31, the processing module 32 and the querying module 33 are connected in sequence. The time series data query apparatus 3 provided by the present embodiment can perform the technical solutions of the above method embodiment, its implementation principle and technical effect are similar, and the present embodiment will not be described in detail here.

Figure 13:
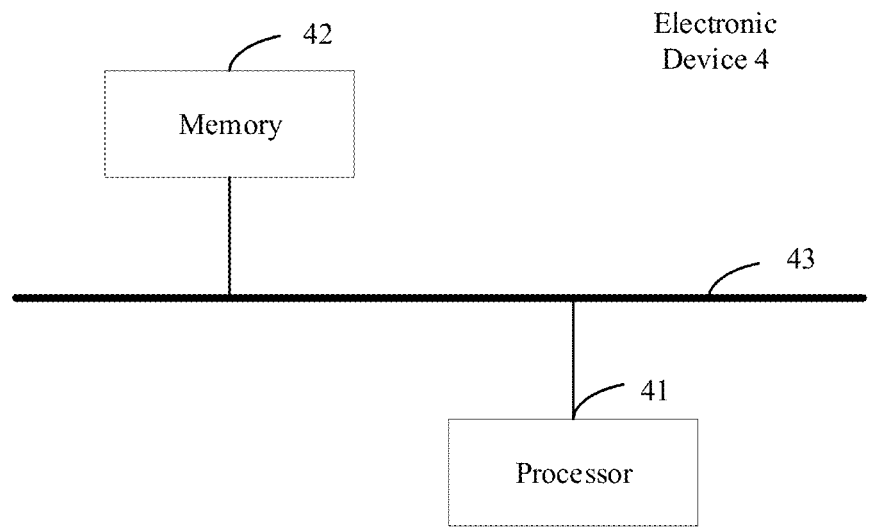
FIG. 13 is a structural schematic diagram of an electronic device according to an embodiment of the present disclosure.

FIG. 13 is a structural schematic diagram of an electronic device according to an embodiment of the present disclosure, and as shown in FIG. 13, the electronic device 4 includes:

a processor 41, and a memory 42 communicatively connected with the processor 41;

the memory 42 stores computer-executable instructions;

the processor 41 executes the computer-executable instructions stored by the memory 42 to implement the time series data query method in the embodiments shown in FIGS. 2-11.

Optionally, the processor 41 and the memory 42 are connected by a bus 43.

The relevant description can be understood with respect to the relevant description and effects corresponding to the steps in the embodiments corresponding to FIGS. 2-11, and will not be described in more detail here.

An embodiment of the present disclosure provides a computer-readable storage medium having stored therein computer-executable instructions that, when executed by a processor, implement the time series data query method provided by any one of the embodiments corresponding to FIGS. 2-11 of the present disclosure.

In order to achieve the above embodiments, an embodiment of the present disclosure further provides an electronic device.

Figure 14:
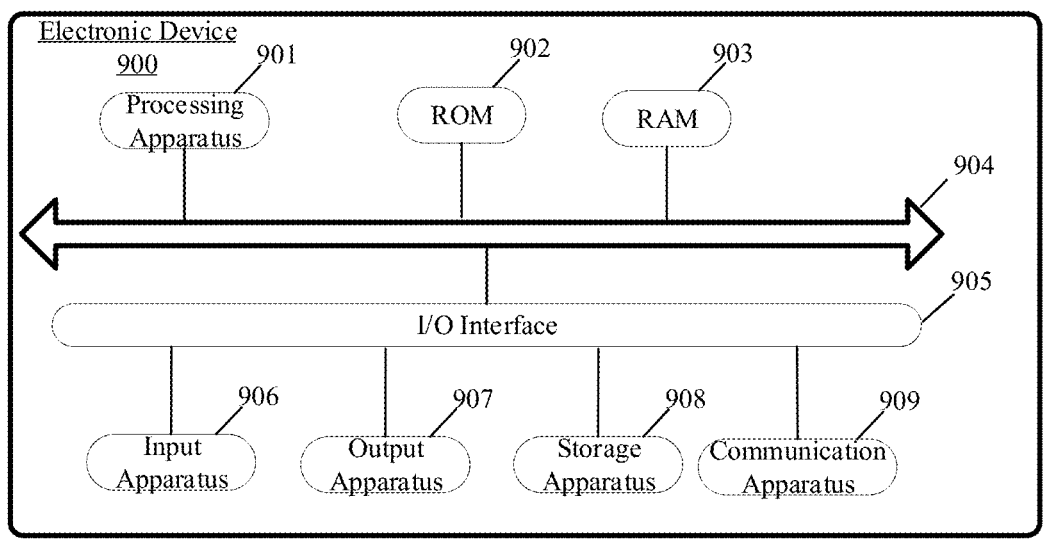
FIG. 14 is a schematic diagram of a hardware structure of an electronic device according to an embodiment of the present disclosure.

Referring to FIG. 14, FIG. 14 illustrates a schematic structural diagram of an electronic device 900 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 14 is merely an example, and should not pose any limitation to the functions and the range of use of the embodiments of the present disclosure. As illustrated in FIG. 14, the electronic device 900 may include a processing apparatus 901 (e.g., a central processing unit, a graphics processing unit, etc.), which can perform various suitable actions and processing according to a program stored in a read-only memory (ROM) 902 or a program loaded from a storage apparatus 908 into a random-access memory (RAM) 903. The RAM 903 further stores various programs and data required for operations of the electronic device 900. The processing apparatus 901, the ROM 902, and the RAM 903 are interconnected by means of a bus 904. An input/output (I/O) interface 905 is also connected to the bus 904.

Usually, the following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a loudspeaker, a vibrator, or the like; a storage apparatus 908 including, for example, a magnetic tape, a hard disk, or the like; and a communication apparatus 909. The communication apparatus 909 may allow the electronic device 900 to be in wireless or wired communication with other devices to exchange data. While FIG. 14 illustrates the electronic device 900 having various apparatuses, it should be understood that not all of the illustrated apparatuses are necessarily implemented or included. More or fewer apparatuses may be implemented or included alternatively. Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 909 and installed, or may be installed from the storage apparatus 908, or may be installed from the ROM 902. When the computer program is executed by the processing apparatus 901, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: display a background image; display an initial picture of a target visual effect at a preset position of the background image; control the target visual effect to gradually change from the initial picture to a target picture in response to a visual effect change instruction triggered by a user; and adjust a filter effect of the background image to allow the filter effect of the background image to gradually change from a first filter effect to a second filter effect during a change of the target visual effect.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider). The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc. In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In a first aspect, according to one or more embodiments of the present disclosure, there is provided a time series data query method, including:

generating, by a time series data engine in response to a query instruction, a query task, wherein the query task is used for querying time series data stored in a storage engine; obtaining a query level of the query task based on the query task, which corresponding to a computing resource consumed by executing the query task; and distributing the query task to a target thread pool corresponding to the time series data engine based on the query level and obtaining a corresponding query result with the target thread pool, wherein the target thread pool has an independent thread resource matching the query level.

According to one or more embodiments of the present disclosure, the query task includes a filtering condition for indicating target time series data, obtaining the query level of the query task based on the query task includes: obtaining a data characteristic of the target time series data based on the filtering condition; obtaining a query cost value representing the computing resource based on the data characteristics of the target time series data; and obtaining the query level based on the query cost value, wherein the query level corresponds to a target cost value interval, the target cost value interval is a cost interval where the query cost value is located.

According to one or more embodiments of the present disclosure, the query cost value includes at least two cost elements, the cost element is used for representing one cost dimension of the query cost value; obtaining the query level based on the query cost value includes: obtaining cost thresholds respectively corresponding to the at least two cost elements; obtaining a corresponding Boolean value of the cost element based on a result of comparing the numerical value of the cost element with a corresponding cost threshold; obtaining the query level based on a result of a logical operation of Boolean values corresponding to the at least two cost elements.

According to one or more embodiments of the present disclosure, the query cost value includes a number of time series, a total filtering times, a complex filtering times, a query time range; the obtaining the query level according to the query cost value includes: performing the following steps: Step 1: if the number of time series is less than a first preset value and the number of filtering times is less than a second preset value, the query is classified as a light query; otherwise, performing step two; Step 2: if the complex number of filtering times is equal to 0, and the time series number is less than 0.5 times of a third preset value, and the total number of filtering times is less than the second preset value, and the query time range is less than or greater than a fourth preset value, the query level is a light query; otherwise, executing step three; Step 3: if the complex number of filtering times is greater than the third preset value and the query time range is greater than the fourth preset value, the query level is heavy query; otherwise, the query level is an overweight query.

In accordance with one or more embodiments of the present disclosure, the data characteristic of the target time series data is a target data characteristic, the query cost value includes a first cost value and/or a second cost value, wherein the first cost value represents a computing resource consumed by filtering time series data with the target data characteristic, the second cost value represents a computing resource consumed by transmitting time series data with the target data characteristic.

According to one or more embodiments of the present disclosure, obtaining the query cost value representing the computing resource based on the data characteristic of the target time series data includes: obtaining filtering times and a complexity of the corresponding single filtering based on the target data characteristic, wherein the number of filtering times represents an estimated traversal times of a query to time series data having the target data characteristic; obtaining the first cost value based on a product of the number of filtering times and the complexity.

According to one or more embodiments of the present disclosure, obtaining filtering times and a complexity of the corresponding single filtering based on the target data characteristic includes at least one of: obtaining a number of tags and a number of time series corresponding to the target time series data based on the target data characteristic, and obtaining the number of filtering times based on the number of tags and the number of time series; and obtaining filtering information based on the target data characteristic, the filtering information representing a filtering type used to query time series data with the target data characteristic, and obtaining the complexity of the single filtering based on the filtering information.

According to one or more embodiments of the present disclosure, obtaining the query cost value representing the computing resource based on the data characteristic of the target time series data includes: obtaining a number of time series, a number of domain and a query time range corresponding to the target time series data based on the target data characteristic; and obtaining the second cost value based on a product of the number of time series, the number of domain, and the query time range.

In accordance with one or more embodiments of the present disclosure, the method further includes: setting thread resource amount of each thread pool based on target logic, wherein the target logic includes maximizing the number of times that the time series data engine executes the query task within a first unit time.

According to one or more embodiments of the present disclosure, obtaining the corresponding query result with the target thread pool includes: obtaining query control information corresponding to the target thread pool, wherein the query control information represents a shortest time interval for the target thread pool to twice execute a query task requested by a same user; and executing the query task based on the query control information, to obtain the query result.

According to one or more embodiments of the present disclosure, the query control information includes an allowed number of query times within a second unit time; executing the query task based on the query control information, to obtain the query result includes: obtaining an accumulated number of requests, wherein the accumulated number of requests is a number of times that the time series data engine executes the query task with the target query level requested by the same user within the second unit time; if the accumulated number of requests is greater than the allowed number of query times, suspending the query task until a preset condition is met.

According to one or more embodiments of the present disclosure, the method further includes: obtaining a corresponding query time consuming after the query task is completed; and updating the query control information of the target thread pool based on the query time consumption corresponding to the query task.

In a second aspect, according to one or more embodiments of the present disclosure, there is provided a time series data query apparatus, including:
  a generation module configured to generate, by a time series data engine in response to a query instruction, a query task, wherein the query task is used for querying time series data stored in a storage engine;
  a processing module configured to obtain a query level of the query task based on the query task, which corresponding to a computing resource consumed by executing the query task; and
  a query module configured to distribute the query task to a target thread pool corresponding to the time series data engine based on the query level and obtain a corresponding query result with the target thread pool, wherein the target thread pool has an independent thread resource matching the query level. According to one or more embodiments of the present disclosure, the query task includes a filtering condition for indicating target time series data, obtain the query level of the query task based on the query task includes: obtain a data characteristic of the target time series data based on the filtering condition; obtain a query cost value representing the computing resource based on the data characteristics of the target time series data; and obtain the query level based on the query cost value, wherein the query level corresponds to a target cost value interval, the target cost value interval is a cost interval where the query cost value is located.

According to one or more embodiments of the present disclosure, the query cost value includes a number of time series, a total filtering times, a complex filtering times, a query time range; when the processing module obtains the query level according to the query cost value, the processing module is specifically configured to perform the following steps: Step 1: if the number of time series is less than a first preset value and the number of filtering times is less than a second preset value, the query is classified as a light query; otherwise, performing step two; Step 2: if the complex number of filtering times is equal to 0, and the time series number is less than 0.5 times of a third preset value, and the total number of filtering times is less than the second preset value, and the query time range is less than or greater than a fourth preset value, the query level is a light query; otherwise, executing step three; Step 3: if the complex number of filtering times is greater than the third preset value and the query time range is greater than the fourth preset value, the query level is heavy query; otherwise, the query level is an overweight query.

In accordance with one or more embodiments of the present disclosure, the data characteristic of the target time series data is a target data characteristic, the query cost value includes a first cost value and/or a second cost value, wherein the first cost value represents a computing resource consumed by filtering time series data with the target data characteristic, the second cost value represents a computing resource consumed by transmitting time series data with the target data characteristic.

According to one or more embodiments of the present disclosure, when obtain the query cost value representing the computing resource based on the data characteristic of the target time series data, the processing module is specifically configured to: obtain filtering times and a complexity of the corresponding single filtering based on the target data characteristic, wherein the number of filtering times represents an estimated traversal times of a query to time series data having the target data characteristic; obtain the first cost value based on a product of the number of filtering times and the complexity.

According to one or more embodiments of the present disclosure, the processing module, when obtain filtering times and a complexity of the corresponding single filtering based on the target data characteristic, includes at least one of: obtain a number of tags and a number of time series corresponding to the target time series data based on the target data characteristic, and obtaining the number of filtering times based on the number of tags and the number of time series; and obtain filtering information based on the target data characteristic, the filtering information representing a filtering type used to query time series data with the target data characteristic, and obtaining the complexity of the single filtering based on the filtering information.

According to one or more embodiments of the present disclosure, the processing module, when obtain the query cost value representing the computing resource based on the data characteristic of the target time series data, is specifically configured to: obtain a number of time series, a number of domain and a query time range corresponding to the target time series data based on the target data characteristic; and obtain the second cost value based on a product of the number of time series, the number of domain, and the query time range.

According to one or more embodiments of the present disclosure, the querying module is further configured to: thread resource amount of each thread pool based on target logic, wherein the target logic includes maximizing the number of times that the time series data engine executes the query task within a first unit time.

According to one or more embodiments of the present disclosure, the query module, when obtain the corresponding query result with the target thread pool is specifically configured to: obtain query control information corresponding to the target thread pool, wherein the query control information represents a shortest time interval for the target thread pool to twice execute a query task requested by a same user; and execute the query task based on the query control information, to obtain the query result.

According to one or more embodiments of the present disclosure, the query control information includes an allowed number of query times within a second unit time; the query module, when execute the query task based on the query control information, to obtain the query result, is configured to: obtain an accumulated number of requests, wherein the accumulated number of requests is a number of times that the time series data engine executes the query task with the target query level requested by the same user within the second unit time; if the accumulated number of requests is greater than the allowed number of query times, suspend the query task until a preset condition is met According to one or more embodiments of the present disclosure, the querying module is further configured to: obtain a corresponding query time consuming after the query task is completed; and update the query control information of the target thread pool based on the query time consumption corresponding to the query task.

In a third aspect, according to one or more embodiments of the present disclosure, there is provided an electronic device, including: at least one processor and a memory; the memory stores computer-executable instructions; the processor executes the computer-executable instructions stored by the memory, causes the at least one processor to perform the time series data query method of the first aspect and the various possible designs of the first aspect.

In a fourth aspect, according to one or more embodiments of the present disclosure, a computer-readable storage medium storing computer-executable instructions thereon is provided, when executed by a processor, implement the time series data query method according to the first aspect and the various possible designs of the first aspect.

In a fifth aspect, according to one or more embodiments of the present disclosure, there is provided a computer program product including a computer program which, when executed by a processor, implements the time series data query method according to the first aspect and the various possible designs of the first aspect.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A time series data query method, comprising:
generating, by a time series data engine in response to a query instruction, a query task, wherein the query task is used for querying time series data stored in a storage engine;
obtaining a query level of the query task based on the query task which corresponding to a computing resource consumed by executing the query task, wherein the query level is determined based on a data characteristic of the target time series data corresponding to the query task; and
determining a target thread pool matched with the query level based on the consumption amount of the computing resource represented by the query level, distributing the query task to the target thread pool corresponding to the time series data engine based on the query level and obtaining a corresponding query result with the target thread pool, wherein the target thread pool is a computing unit set in the time series data engine, and the target thread pool has an independent thread resource matching the query level.

2. The method according to claim 1, wherein the query task comprises a filtering condition for indicating target time series data, obtaining the query level of the query task based on the query task comprises:
    obtaining the data characteristic of the target time series data based on the filtering condition;
    obtaining a query cost value representing the computing resource based on the data characteristic of the target time series data; and
    obtaining the query level based on the query cost value, wherein the query level corresponds to a target cost value interval, the target cost value interval is a cost interval where the query cost value is located.

3. The method according to claim 2, wherein the query cost value comprises at least two cost elements, the cost element is used for representing one cost dimension of the query cost value;
    obtaining the query level based on the query cost value comprises:
        obtaining cost thresholds respectively corresponding to the at least two cost elements;
        obtaining a corresponding Boolean value of the cost element based on a result of comparing the numerical value of the cost element with a corresponding cost threshold;
        obtaining the query level based on a result of a logical operation of Boolean values corresponding to the at least two cost elements.

4. The method according to claim 2, wherein the data characteristic of the target time series data is a target data characteristic, the query cost value comprises at least one of a first cost value or a second cost value,
    wherein the first cost value represents a computing resource consumed by filtering time series data with the target data characteristic, the second cost value represents a computing resource consumed by transmitting time series data with the target data characteristic.

5. The method according to claim 4, wherein obtaining the query cost value representing the computing resource based on the data characteristic of the target time series data comprises:
    obtaining a number of filtering times and a complexity of the corresponding single filtering based on the target data characteristic, wherein the number of filtering times represents an estimated traversal times of a query to time series data having the target data characteristic;
    obtaining the first cost value based on a product of the number of filtering times and the complexity.

6. The method according to claim 5, wherein obtaining filtering times and a complexity of the corresponding single filtering based on the target data characteristic comprises at least one of:
    obtaining a number of tags and a number of time series corresponding to the target time series data based on the target data characteristic, and obtaining the number of filtering times based on the number of tags and the number of time series; or
    obtaining filtering information based on the target data characteristic, the filtering information representing a filtering type used to query time series data with the target data characteristic, and obtaining the complexity of the single filtering based on the filtering information.

7. The method according to claim 4, wherein obtaining the query cost value representing the computing resource based on the data characteristic of the target time series data comprises:
    obtaining a number of time series, a number of domain and a query time range corresponding to the target time series data based on the target data characteristic; and
    obtaining the second cost value based on a product of the number of time series, the number of domain, and the query time range.

8. The method according to claim 1, further comprising:
    setting thread resource amount of each thread pool based on target logic,
    wherein the target logic comprises maximizing the number of times that the time series data engine executes the query task within a first unit time.

9. The method according to claim 1, wherein obtaining the corresponding query result with the target thread pool comprises:
    obtaining query control information corresponding to the target thread pool, wherein the query control information represents a shortest time interval for the target thread pool to twice execute a query task requested by a same user; and
    executing the query task based on the query control information, to obtain the query result.

10. The method according to claim 9, wherein the query control information comprises an allowed number of query times within a second unit time; executing the query task based on the query control information, to obtain the query result comprises:
    obtaining an accumulated number of requests, wherein the accumulated number of requests is a number of times that the time series data engine executes the query task with the target query level requested by the same user within the second unit time; and
    when the accumulated number of requests is greater than the allowed number of query times, suspending the query task until a preset condition is met.

11. The method according to claim 9, further comprising:
    obtaining a corresponding query time consuming after the query task is completed; and
    updating the query control information of the target thread pool based on the query time consumption corresponding to the query task.

12. An electronic device comprising:
    at least a processor, and
    a non-transitory memory with instructions thereon,
    wherein the instructions upon execution by the processor, cause the processor to:
    generate, by a time series data engine in response to a query instruction, a query task, wherein the query task is used for querying time series data stored in a storage engine;
    obtain a query level of the query task based on the query task which corresponding to a computing resource consumed by executing the query task, wherein the query level is determined based on a data characteristic of the target time series data corresponding to the query task; and
    determine a target thread pool matched with the query level based on the consumption amount of the computing resource represented by the query level, distribute the query task to the target thread pool corresponding to the time series data engine based on the query level and obtain a corresponding query result with the target thread pool, wherein the target thread pool is a computing unit set in the time series data engine, and the target thread pool has an independent thread resource matching the query level.

13. The electronic device according to claim 12, wherein the query task comprises a screening condition for indicating target time series data, the processor is caused to:
- obtain the data characteristic of the target time series data based on the screening condition;
- obtain a query cost value representing the computing resource based on the data characteristic of the target time series data; and
- obtain the query level based on the query cost value, wherein the query level corresponds to a target cost value interval, the target cost value interval is a cost interval where the query cost value is located.

14. The electronic device according to claim 13, wherein the query cost value comprises at least two cost elements, the cost element is used for representing one cost dimension of the query cost value;

the processor is further caused to:
- obtain cost thresholds respectively corresponding to the at least two cost elements;
- obtain a corresponding Boolean value of the cost element based on a result of comparing the numerical value of the cost element with a corresponding cost threshold;
- obtain the query level based on a result of a logical operation of Boolean values corresponding to the at least two cost elements.

15. The electronic device according to claim 13, wherein the data characteristic of the target time series data is a target data characteristic, the query cost value comprises at least one of a first cost value or a second cost value,
- wherein the first cost value represents a computing resource consumed by screening time series data with the target data characteristic, the second cost value represents a computing resource consumed by transmitting time series data with the target data characteristic.

16. The electronic device according to claim 15, wherein the processor is further caused to:
- obtain screening times and a complexity of the corresponding single screening based on the target data characteristic, wherein the number of screening times represents an estimated traversal times of a query to time series data having the target data characteristic; and
- obtain the first cost value based on a product of the number of filters and the complexity.

17. The electronic device according to claim 16, wherein the processor is further caused to obtain screening times and a complexity of the corresponding single screening based on the target data characteristic comprises at least one of:
- obtain a number of tags and a number of time series corresponding to the target time series data based on the target data characteristic, and obtaining the screening times based on the number of tags and the number of time series; or
- obtain screening information based on the target data characteristic, the screening information representing a screening type used to query time series data with the target data characteristic, and obtain the complexity of the single screening based on the screening information.

18. The electronic device according to claim 15, wherein the processor is further caused to:
- obtain a number of time series, a number of domain and a query time range corresponding to the target time series data based on the target data characteristic; and
- obtain the second cost value based on a product of the number of time series, the number of domain, and the query time range.

19. The electronic device according to claim 12, the processor is further caused to:
- set thread resource amount of each thread pool based on target logic,
- wherein the target logic comprises maximizing the number of times that the time series data engine executes the query task within a first unit time.

20. A non-transitory computer-readable storage medium storing instructions that cause at least a processor to:
- generate, by a time series data engine in response to a query instruction, a query task, wherein the query task is used for querying time series data stored in a storage engine;
- obtain a query level of the query task based on the query task which corresponding to a computing resource consumed by executing the query task, wherein the query level is determined based on a data characteristic of the target time series data corresponding to the query task; and
- determine a target thread pool matched with the query level based on the consumption amount of the computing resource represented by the query level, distribute the query task to the target thread pool corresponding to the time series data engine based on the query level and obtain a corresponding query result with the target thread pool, wherein the target thread pool is a computing unit set in the time series data engine, and the target thread pool has an independent thread resource matching the query level.

* * * * *